March 2, 1937.  A. E. HILL  2,072,751
RAIL JOINT
Original Filed Feb. 11, 1935  2 Sheets-Sheet 1
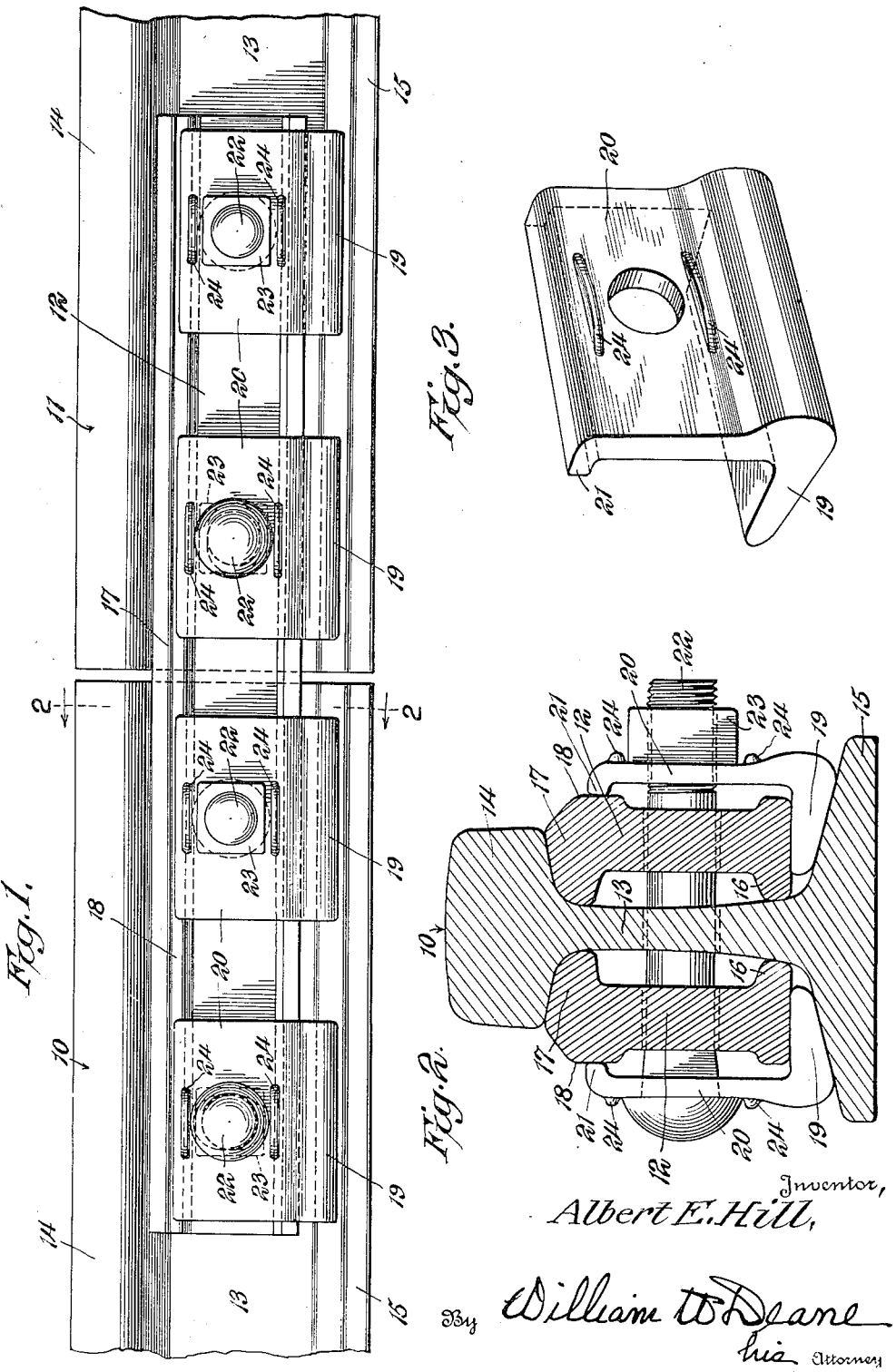
Inventor,
Albert E. Hill,
By William W. Deane
his Attorney

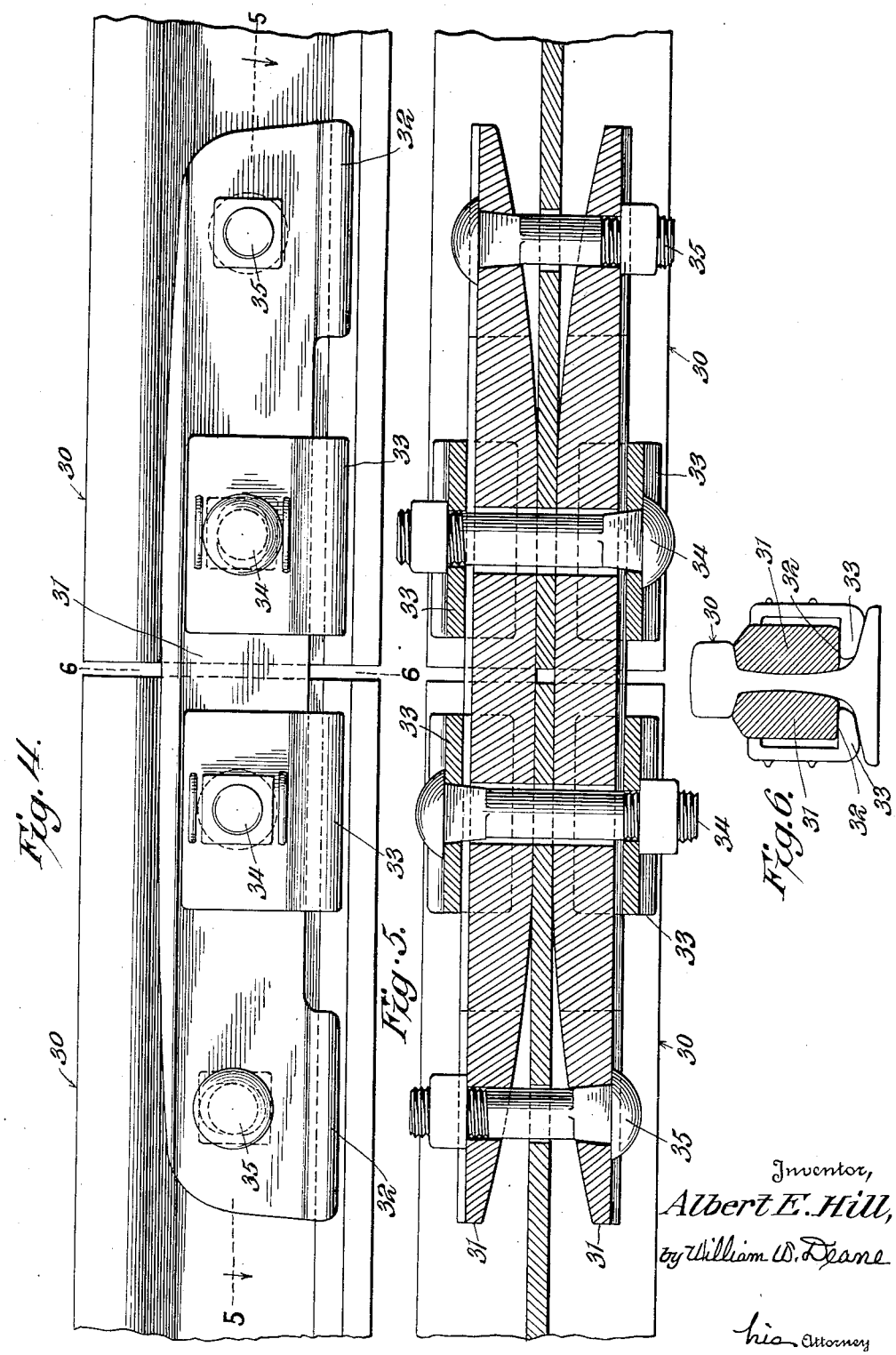

Patented Mar. 2, 1937

2,072,751

UNITED STATES PATENT OFFICE 2,072,751

RAIL JOINT

Albert E. Hill, New York, N. Y.

Application February 11, 1935, Serial No. 6,109
Renewed December 4, 1936

2 Claims. (Cl. 238—244)

The object of the invention is to provide a rail joint having means to secure precise alignment of the rails through contact of the coupling bars direct with the webs; to provide a joint having coupling means including coupling bars in which the adjustment may be so made in the assembly that the bars will be raised at the centre, therefore offsetting the tendency to depression at the centre when in use; and to provide a rail joint which is of simple form, susceptible of cheap construction, highly efficient in operation, and of a form that will maintain the relation of its parts under all working conditions.

The particular object of the invention is to provide a splice bar formed of several parts, no one part of which is complete in itself as to splice bar effect but all such parts when assembled and connected as a whole, providing a rail joint connection designed to meet the fishing height difference found in new rolled rails to an appreciable degree and to an even greater degree in old worn rails.

Applicant has been enabled by the development of a recently improved instrument to determine the difference in fishing height of rail ends designed to be connected by splice bars. It has been found that in practically every instance the four fishing heights of two abutting rail ends differ in new rails to approximately .025 inch and that this difference on worn or used rails averages three or four times that of new rails. Incident to this condition, which has been proven to be an almost universal condition as a result of many hundreds of different tests, the application of angle bars of the conventional type is usually unsatisfactory. They are designed so that the bars overfill the fishing height of the rail, that is, contact beneath the head and on top of the angular base and ordinarily do not contact with the web of the rail. Therefore, it will be evident that on the two fishing sides of the rail joint, where the two abutting rails are at variance in fishing height measurements and this is almost universal, the splice bar will wedge tight in one fishing surface and remain slightly loose in the other, and this without regard to the tension derived from the securing bolts. Therefore, the angle bar under service on the loose side gradually wears looser, resulting to a material extent in many of the troubles to which rails joints are subjected.

Recognizing this difficulty and the high importance of a permanent web contact bar which makes for better alignment in tracks, the splice bar of the present invention is designed so that it is not of the fishing height of the rail and there is combined with this particular bar and as a material part thereof a plurality of saddles, which saddles have a clearance to move inward and upward on a free fulcrum point to take up and compensate for all differences in the four fishing heights of the abutting ends of the rails. There is thus provided at all times a tight fitting web contact rail joint assembly which in its function is complete for uniting meeting rail ends of either new or worn rails.

With this object in view, the invention consists in a construction and combination of parts of which preferred embodiments are illustrated in the accompanying drawings, in which:

Figure 1 is a side elevational view of a joint construction in accordance with my invention.

Figure 2 is a vertical sectional view on a plane indicated by the line 2—2 of Figure 1.

Figure 3 is a perspective view of one of the saddle bars and its connected saddle plate.

Figure 4 is a side elevational view showing the invention incorporated in an "Evertite" joint.

Figures 5 and 6 are sectional views on the planes indicated by the lines 5—5 and 6—6 respectively of Figure 4.

The joint is formed by coupling together the rails 10 and 11 by means of angular bars 12 which span the line of juncture between the rails but which are of less width or height than the height of the rail webs 13. That is, the over or height dimension of the coupling bars is less than the distance between the underside of the rail ball 14 and base 15.

The coupling bars are not of uniform thickness, being formed at the lower edges with laterally projecting feet 16 and the upper edge with a head portion 17 which on the one side follows the contour of the throat between the ball and web of the rail. The head on the other side is formed into a lateral extension 18.

The foot portion 16 of the coupling bars is flat on the underside and lies in the plane at right angles to a vertical line drawn through the centre of bars or centre of the webs.

The coupling bars are disposed one on each side of the connecting rails with their heads seated in the throats formed at the juncture of the ball and web of the rails but with their foot or base portions seated upon saddle bars 19 which are flat at their upper surfaces with their under faces resting on and conforming to the angular upper surfaces of the rail flanges. The saddle bars are formed with upstanding saddle plates 20 which parallel the coupling bars and are terminally formed with inturned bearing feet 21 which engage the lateral extensions 18. The bolts 22 pass through the saddle plates, the coupling bars and the rail webs and when the nuts 23 are tightened, the coupling bars are forced into lateral contact with the rail webs and at the same time are elevated by the inner movement of the saddles sliding upwardly on the rail flanges. The head portions of the coupling bars are thus forced firmly into the throats under the rail heads and the latter are given perfect alignment.

The saddle plates on the outer faces are formed with spaced parallel ribs 24 between which the nuts and heads of the bolts may seat, thus preventing the attaching nuts from working loose. The plates are relatively thin and, being springy, the nuts may be turned over the ribs in the attaching operation.

In the movement of the saddle bars, the projections 18 act as free fulcrums for the saddle plates by reason of being engaged by the bearing feet 21.

The inward and upward movement of the saddle cuts down or shortens the fishing space thus causing a tight fitting bar in the rail at all times through the spring action of the upstanding spring plates 20, which automatically takes up any slight wear that may occur.

The position of these saddles on the rail base, caused by their spring tension, automatically compensate for the tolerance or differences found in the four fishing surfaces in the two abutting rail ends.

The hereinbefore described saddles may be applied to all bolts in a rail joint assembly and they constitute the filling means on all designs of rail joint splice bars which are made with fishing surfaces less than the fishing surfaces of the rails to which they are applied.

In the modification shown in Figures 4 to 6, the rails 30 are coupled by means of the well known "Evertite" bars 31 which, however, are modified by the removal, from their lower edges, of a part of the stock to leave under edge portions 32 which are flat, lie in planes at right angles to the plane of the centre line of the rail webs, and are spaced from the rail flanges. The saddles 33, which are identical with the saddles shown in Figures 1 to 3 of drawings, are applied next to the junction line of the rails and when the bolts 34 are attached, function in the same way as in the other form of the invention, the bolts 35 connecting the bars 31 adjacent their extremities, as is conventional with "Evertite" bars.

In the application of the saddles of the invention to "Evertite" bars, the latter have the customary small bearing contact with the balls and webs of the rails. It is necessary that these contacts be continuously maintained and the saddle members provide for this, the differences in fishing surfaces allowed by tolerance in rolling and resulting from wear being automatically compensated for by the inward spring tendency imparted to the saddle bars. By the use of the improved saddle members, the "Evertite" bars may be constructed of one fishing height for a given size rail and may then be used interchangeably with new and worn rails, the increased height of fishing surfaces in the latter being compensated for as explained above.

The coupling bars can be given a central elevation to offset the tendency to depression at the centre by tightening up on the centre bolts and backing off on the outside bolts, this relieving the saddles at their ends but forcing them inward at the centre.

The invention having been described, what is claimed as new and useful is:

1. A joint connection for the meeting ends of railroad rails, comprising a coupling bar of less than the minimum fishing height of the meeting ends of the rails, said bar fitting beneath the balls of the rails, the upper end of the coupling bar having an outer face in parallelism with the rail web, and terminating above the rail flanges in a plane at substantial right angles to the webs of the rails, a bolt passing through the coupling bar and the rail web, and a unitary saddle bar secured by said bolt and having a lower wedge shaped portion to underlie the bottom of the coupling bar and bear on the rail flange the upper portion of the saddle bar having an inturned end to bear directly against and rock freely on the upper outer face of the coupling bar, whereby tightening of the bolt rocks the saddle bar on the inturned upper end as a fulcrum to force the lower wedge-shaped portion beneath the coupling bar and compel the coupling bar to bear against the rail web with complete compensation for the difference in fishing height of the coupling bar and rail end.

2. A construction as defined in claim 1, wherein that portion of the saddle bar intermediate the lower portion and inturned upper portion is resilient to compensate for slight loosening of the bolt connection to maintain the lift and inward pressure of the saddle bar.

ALBERT E. HILL.